Sept. 12, 1967
T. H. COUR ETAL
3,341,600
PURIFICATION OF DIAMINE
Filed Dec. 21, 1964
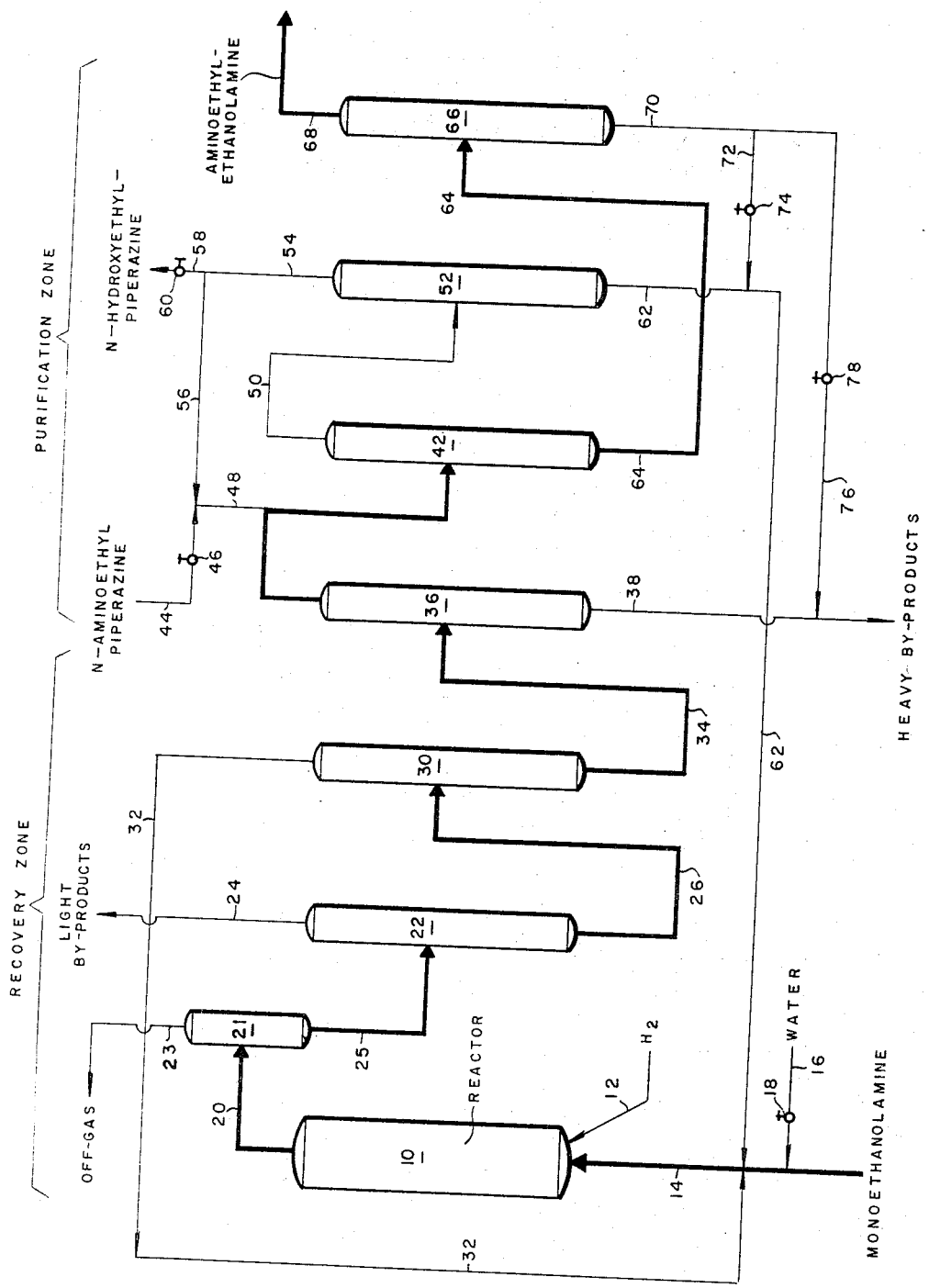
INVENTOR.
THOMAS H. COUR,
HERBERT G. MUHLBAUER,
BY
*Carl G. Ries*
ATTORNEY.

United States Patent Office
3,341,600
Patented Sept. 12, 1967

3,341,600
PURIFICATION OF DIAMINE
Thomas H. Cour and Herbert G. Muhlbauer, Austin, Tex., assignors to Jefferson Chemical Company, Inc., Houston, Tex., a corporation of Delaware
Filed Dec. 21, 1964, Ser. No. 419,732
3 Claims. (Cl. 260—584)

This invention relates to a method for the purification of N-aminoethylethanolamine. More particularly, this invention relates to a method for removing contaminating quantities of N-hydroxyethylpiperazine from N-aminoethylethanolamine.

In copending Lichtenwalter application Ser. No. 420,119, filed of an even date herewith and entitled, "Method for the Production of Amine Dimer," there is disclosed a method for the preparation of N-aminoethylethanolamine from monoethanolamine. As is pointed out in said copending application, a serious problem is encountered in purifying the N-aminoethylethanolamine because of the concomitant production during the process of contaminating quantities of N-hydroxyethylpiperazine.

It has been discovered in accordance with the present invention that this problem can be solved, that N-aminoethylethanolamine can be separated with good efficiency from N-hydroxyethylpiperazine and that purification by distillation is accomplished by entrainer distillation in the presence of N-aminoethylpiperazine.

The invention will be further illustrated by the accompanying drawing, which is a schematic flow sheet illustrating a preferred method for the practice of the present invention.

Turning now to the drawing, there is shown a reactor 10 to which monoethanolamine may be charged, together with hydrogen, and, if desired, together with up to 50 wt. percent of water. Hydrogen is charged to reactor 10 by way of a charge line 12, and monoethanolamine is charged by way of a charge line 14. Water may be introduced into the charge line 14 by a branch line 16 controlled by a valve 18.

Within the reactor 10 the feed components are contacted with a hydrogenation catalyst of a type described in said copending Lichtenwalter application which contains a nickel, copper and a normally nonreducible metal oxide in proportions to provide, on an oxide-free basis, from about 60 to about 85 mol percent of nickel, about 14 to 37 mol percent copper and 1 to 5 mol percent of a nonreducible metal oxide. More preferably, the catalyst will contain 72 to 78 mol percent nickel, 20 to 25 mol percent copper and 1 to 3 mol percent of a nonreducible metal oxide. The nonreducible metal oxide is selected from the group consisting of chromium oxide, manganese oxide, molybdenum oxide and thorium oxide. Chromium oxide is preferred.

The reaction conditions employed in reactor 10 include, for example, a temperature within the range of about 170° to about 200° C., a hydrogen pressure of about 2,000 to about 3,000 p.s.i. and a space velocity of about 0.5 to about 2 grams of reactants per milliliter of reactor volume per hour.

The above reaction conditions should be correlated to provide for monoethanolamine conversion within the range of about 10% to about 30%.

The products of the reaction will comprise a plurality of amines, including low boiling amines (light, low-boiling amine products), such as piperazine, unreacted monoethanolamine, N-aminoethylethanolamine, N-hydroxyethylpiperazine, a minor amount of N-aminoethylpiperazine, and heavier by-products.

In general, and at conversion levels for the monoethanolamine feed stock of about 10% to 40%, the crude reaction product will comprise from about 25 to 75 mol percent of N-aminoethylethanolamine, about 10 to 40 mol percent of piperazine, about 1 mol percent or less of diethylenetriamine, about 0.5 to 15 mol percent of N-aminoethylpiperazine, about 0.5 to 10 mol percent of N-hydroxyethylpiperazine, and about 1 to 10 mol percent of diethanolamine. Normally, and when operating at a preferred conversion of 15% to 30%, the mol percent yields will be in the range from about 40 to 55 for N-aminoethylethanolamine, 10 to 20 for piperazine, 0.5 to 1 for diethylenetriamine, 3 to 7 for N-aminoethylpiperazine, 1 to 5 for N-hydroxyethylpiperazine and 0.1 to 2 for diethanolamine.

A crude N-aminoethylethanolamine fraction is obtained from the crude reaction product in a recovery zone, and the thus-obtained N-aminoethylethanolamine is purified in a purification zone.

Thus, the reaction product is discharged from the reactor 10 by a line 20 leading to a gas stripping zone 21, wherein off-gas comprising hydrogen is removed by a line 23 for recycle, if desired. Bottoms 25 from the zone 21, after pressure reduction, is charged to a first distillation zone 22 for separation of light products nominally boiling below about 160° C. (e.g., water and piperazine).

The light products are discharged from zone 22 by a line 24, and the bottoms is discharged by a line 26 leading to a second distillation zone 30 for separation of a monoethanolamine recycle fraction nominally boiling at atmospheric pressure within the range of about 160° to about 210° C. This fraction is discharged as a distillate recycle fraction from the zone 30, and the bottoms is discharged by a line 34 leading to a third distillation zone 36.

A crude distillate fraction 40 having a nominal atmospheric pressure boiling range of about 210° to about 250° C. is obtained in zone 36 which comprises N-aminoethylethanolamine, N-hydroxyethylpiperazine and a minor amount of aminoethylpiperazine. Heavier by-products are discharged from zone 36 by way of a line 38.

In accordance with the present invention, the crude distillate fraction 40 is further treated in the purification zone so as to obtain a lower boiling distillate by-products fraction, a purified N-aminoethylethanolamine distillate product fraction and a higher boiling by-products fraction. This can be accomplished in a single distillation column, but it is preferable to employ a plurality of columns. Also, it is preferable to employ subatmospheric pressure.

Thus, the overheads fraction 40 from zone 36 is charged to a fourth (vacuum) distillation zone 42. In addition, at least about 20 wt. percent of N-aminoethylpiperazine is charged to the zone 42. Suitably, the amount may be within the range from about 20 to about 50 wt. percent of the material discharged by way of a line 40 from zone 36. More than 50 wt. percent of N-aminoethylpiperazine can be employed, but the excess will not improve the separation. The N-aminoethylpiperazine can be charged to the system by way of a line 44 controlled by a valve 46 leading to a charge line 40 for the column 42 in the desired amount. The overhead fraction 50 from column 42 will comprise N-aminoethylpiperazine and N-hydroxyethylpiperazine. The fraction 50 may suitably be charged to a distillation column 52 (vacuum) wherein it is separated into an overhead fraction 54 comprising N-aminoethylpiperazine. A portion of the overhead fraction 54 may be recycled by way of a line 56 leading to a line 40, and another portion may be discharged by a line 58 controlled by a valve 60 in order to control build-up of N-hydroxyethylpiperazine in the system. The bottoms from the column 52, composed principally of N-hydroxyethylpiperazine, and some N-aminoethylethanolamine and N-aminoethylpiperazine, may be suitably recycled by way of a line 62 to the charge line 14 to reactor 10, or discharged to line 38 as residue.

The bottoms fraction 64 from column 42 will be composed primarily of N-aminoethylethanolamine and will be substantially free from N-hydroxyethylpiperazine. The fraction may suitably be charged to distillation column 66 (vacuum) where it can be separated into a N-aminoethylethanolamine distillate fraction 68 and a heavier fraction 70 composed of higher boiling amine residues which may be recycled to the line 62 by way of branch line 72 controlled by valve 74 or, if desired, to line 38 by branch line 76 controlled by valve 78.

The invention will be further illustrated by the following specific examples, which are given by way of illustration and not as limitation on the scope of this invention.

EXAMPLE I

As stated earlier, N-hydroxyethylpiperazine and N-aminoethylethanolamine have essentially coincidental vapor pressures, thereby making it important to separate one from the other by simple distillation. This is illustrated, for example, by a partial vacuum distillation at a reflux ratio of 15/1 of a fraction containing 83% N-aminoethylethanolamine and 9.5% hydroxyethylpiperazine, the remainder being essentially higher boiling by-products.

The recovery from this distillation of 99% pure N-aminoethylethanolamine is only 53 wt. percent.

EXAMPLE II

The significant improvement of the present invention is illustrated by a series of tests involving six different entraining agents, employing an amount equivalent to about 15 wt. percent of a binary mixture of N-aminoethylethanolamine and N-hydroxyethylpiperazine containing 3.4% of N-hydroxyethylpiperazine. In each test, the mixture was distilled into three aliquot initial fractions and into two successive fractions, each of which contain twice the weight of the first fraction. The six solvents and their respective behavior are listed in Table 1:

TABLE I

| Agent | AEEA [1] Recovery (Distillate), Percent | HEP [2] Content of Distillate, Percent |
|---|---|---|
| None | 45 | 0.7 |
| Dichlorotoluene | 54 | 0.7 |
| Propylene glycol | 40 | 1.0 |
| Aminoethylpiperazine | 81.5 | 1.15 |
| Do | 61.6 | 0.4 |
| Jeffersol® DB [3] | 61.7 | 0.9 |
| Jeffersol® DM [4] | 59.6 | 1.06 |
| N-aminopropylmorpholine | 61.6 | 1.03 |

[1] AEEA—Aminoethylethanolamine.
[2] HEP—N-hydroxyethylpiperazine.
[3] Diethylene glycol monobutyl ether.
[4] Diethylene glycol monomethyl ether.

The preceding table illustrates quite clearly that N-aminoethylpiperazine is a highly efficient entrainer. This is further illustrated by comprehensive data on a series of tests, which is set forth in Table 2:

TABLE 2.—ENTRAINER DISTILLATION OF THE SYSTEM N-HYDROXYETHYLPIPERAZINE-N-AMINOETHYLETHANOLAMINE

| | Run No. | | | | | | |
|---|---|---|---|---|---|---|---|
| | 2736–39 | 2736–16 | 2736–18 | 2736–20 | 2736–21 | 2736–22 | 2736–24 |
| | Azeotroping Agent | | | | | | |
| | None | Dichlorotoluene | Propylene glycol | N-aminoethylpiperazine | Diethylene glycol monobutyl ether | Diethylene glycol monomethyl ether | N-aminopropylmorpholine |
| Operating pressures, mm. Hg | 10 | 10 | 10 | 10 | 10 | 10 | 10 |
| Charge weights, gm.: | | | | | | | |
| AEEA | 484 | 483 | 483 | 483 | 483 | 483 | 483 |
| HEP | 16 | 17 | 17 | 17 | 17 | 17 | 17 |
| Az. ag | | 75 | 75 | 75 | 75 | 75 | 75 |
| Total | 500 | 575 | 575 | 575 | 575 | 575 | 575 |
| Fraction No. 1: | | | | | | | |
| Weight, grams | 50 | 54 | 50 | 49 | 50 | 50 | 49 |
| Temp. range, °C | IBP-122 | IBP-122 | IBP-77 | IBP-98 | IBP-109 | IBP-79 | IBP-92 |
| Percent HEP | 4.6 | 12.1 | | 0.2 | 2.7 | | |
| Percent AEEA (by diff.) | 95.4 | 87.9 | 0.2 | 99.0 | 7.6 | ~90 | ~90 |
| Percent Az. ag | | | 99.0 | | 89.0 | | |
| Fraction No. 2: | | | | | | | |
| Weight, grams | 51 | 52 | 51 | 53 | 49 | 51 | 49 |
| Temp. range, °C | 122–124 | 122 | 77–116 | 98–117 | 109–119 | 79–126 | 92–118 |
| Percent HEP | 5.1 | 7.5 | 12.4 | 9.0 | 9.1 | 10.1 | 8.5 |
| Percent AEEA (by diff.) | 94.9 | 92.4 | 43.5 | 33.4 | 36.3 | | |
| Percent Az. ag | | | 43.4 | 58.4 | 54.0 | | |
| Fraction No. 3: | | | | | | | |
| Weight, grams | 50 | 54 | 51 | 51 | 51 | 53 | 52 |
| Temp. range, °C | 122–125 | 122 | 116–117 | 117–121 | 119–121 | 126–122 | 118–120 |
| Percent HEP | 4.3 | 4.4 | 10.9 | 12.6 | 9.6 | 9.2 | 10.8 |
| Percent AEEA | 95.7 | 93.6 | 89.0 | 82.6 | 79.4 | 91.8 | 89.2 |
| Percent Az. ag | | | | 4.8 | | | |
| Fraction No. 4: | | | | | | | |
| Weight, grams | 100 | 107 | 108 | 103 | 104 | 103 | 105 |
| Temp. range, °C | 125–127 | 122–126 | 117 | 121 | 122–123 | 122–119 | 120–122 |
| Percent HEP | 3.2 | 1.6 | 5.2 | 3.3 | 5 | 5.5 | 5.9 |
| Percent AEEA | 96.8 | 96.0 | 94.8 | 96.7 | 95 | 94.5 | 94.1 |
| Percent Az. ag | | | | | | | |
| Fraction No. 5: | | | | | | | |
| Weight, grams | 101 | 106 | 105 | 103 | 103 | 103 | 104 |
| Temp. range, °C | 127–126 | 126–128 | 117–118 | 121 | 123 | 119–120 | 122 |
| Percent HEP | 1.0 | 0.1 | 1.4 | 1.0 | 2.2 | 2.2 | 2.4 |
| Percent AEEA | 99.0 | 99.9 | 98.6 | 99.0 | 97.8 | 97.8 | 97.6 |
| Percent Az. ag | | | | | | | |
| Bottoms: | | | | | | | |
| Weight, grams | 118 | 187 | 195 | 193 | 198 | 187 | 197 |
| Percent HEP | 0.4 | 0.3 | 1.0 | 0.1 | 0.3 | 0.2 | 0.3 |
| Percent AEEA | 99.6 | 27.4 | 99.0 | 99.9 | 99.7 | 99.8 | 99.7 |
| Percent Az. ag | | 72.3 | | | | | |
| Total accounting, percent | 94.0 | 97.3 | 97.3 | 96.0 | 96.5 | 95.1 | 96.6 |
| HEP accounting, percent | 74.0 | 89.0 | 123.0 | 94.0 | 110.3 | 107.8 | 112.1 |
| Recovery of AEEA [1] | 45.0 | 54.0 | 39.9 | [2] 81.5 | 61.7 | 59.6 | 61.6 |
| Percent HEP in recovered AEEA | 0.68 | 0.89 | 1.0 | 1.15 | 0.9 | 1.06 | 1.03 |

[1] Includes AEEA in bottoms. [2] Also 61.6% rec. of 0.4% HEP.

Having thus described our invention, what is claimed is:

1. In a method for recovering high purity N-aminoethylethanolamine by distillation from a crude reaction mixture comprising N-aminoethylethanolamine, monoethanolamine, N-hydroxyethylpiperazine and N-aminoethylpiperazine and wherein a crude distillate fraction is obtained which contains a major amount of N-aminoethylethanolamine, at least 0.1 mol percent of N-hydroxyethylpiperazine and not more than about 15 mol percent of N-aminoethylpiperazine, the improvement which comprises:
   (A) adjusting the N-aminoethylpiperazine of said crude fraction to a concentration of at least about 20 wt. percent,
   (B) fractionally distilling said thus-modified crude fraction to obtain a
   (C) N-aminoethylpiperazine distillate fraction containing substantially all of the said N-hydroxyethylpiperazine, and
   (D) a higher boiling purified N-aminoethylethanolamine distillate fraction.

2. A method for recovering N-aminoethylethanolamine from a crude reaction mixture obtained by contacting monoethanolamine with a hydrogenation catalyst under low conversion conditions whereby the crude reaction mixture is formed which comprises N-aminoethylethanolamine, piperazine, diethylenetriamine, N-aminoethylpiperazine, N-hydroxyethylpiperazine, diethanolamine and aminoethylethanolamine, said method comprising the steps of:
   (A) fractionally distilling said crude reaction product in a recovery zone to obtain a low-boiling first distillate fraction comprising piperazine, an intermediate second distillate fraction comprising monoethanolamine and a third higher boiling distillate fraction comprising a major amount of aminoethylethanolamine, at least about 0.1 mol percent of N-hydroxyethylpiperazine and not more than about 15 mol percent of N-aminoethylpiperazine;
   (B) mixing N-aminoethylpiperazine with said third distillate fraction in an amount to provide a mixture containing at least 20 wt. percent of N-aminoethylpiperazine,
   (C) distilling said mixture in a purification zone at a subatmospheric pressure to obtain a fourth distillate fraction comprising N-aminoethylpiperazine and substantially all of the N-hydroxyethylpiperazine and a fifth purified N-aminoethylethanolamine distillate fraction.

3. A method as in claim 2 wherein the mixture contains from about 20 to about 50 wt. percent of N-aminoethylpiperazine.

References Cited
UNITED STATES PATENTS 3,151,115  9/1964  Moss et al. _____ 260—268

CHARLES B. PARKER, *Primary Examiner.*

D. PHILLIPS, *Assistant Examiner.*